Dec. 23, 1947.  J. B. TEGARTY  2,433,171
PLASTIC CLOTHESPIN
Filed Jan. 2, 1947
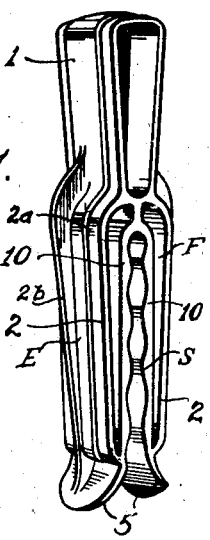
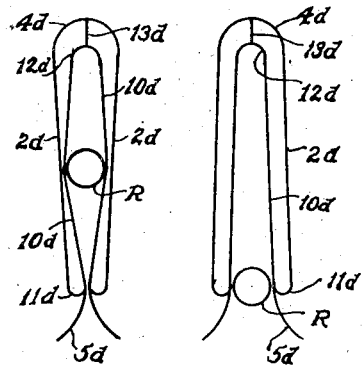
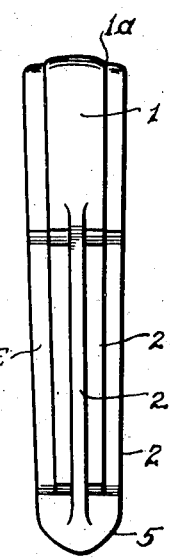
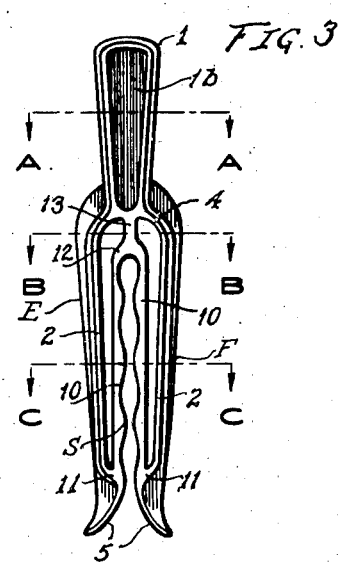
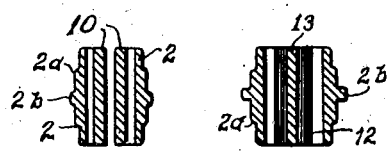
INVENTOR.
JOHN B. TEGARTY,
BY
Justin W. Macklin
ATTY Patented Dec. 23, 1947

2,433,171

UNITED STATES PATENT OFFICE 2,433,171

PLASTIC CLOTHESPIN

John B. Tegarty, Buffalo, N. Y.

Application January 2, 1947, Serial No. 719,878

4 Claims. (Cl. 24—138)

This invention relates to clothespins.

Among the objects are to provide a clothespin having a structure presenting a gripping surface readily yielding to pass over a line and material to be held and which has an exceptionally large gripping capacity for the size and nature of the clothespin structure.

It is well known that in unitary clothespin structures of wood or the like, the two legs of the bifurcated member must be joined with sufficient material to resist the spreading effect of the required gripping action. The legs must be stiff enough for this purpose, and yet be flexible for spreading or yielding over the line and material to be held. This usually requires a sizable body portion at the juncture of the legs and handle.

Heretofore to meet these conditions the conventional type of unitary clothespin required considerable weight and size so that if made of synthetic molded material, such as thermo plastics, which may be injection molded, for example, the amount of material required resulted in objectionable expense.

Attempts have been made to lighten the material by arrangements of rib and reinforcing design with thin sections. Special shapes and small sizes, designed to save material, sacrifice the necessary or desirable strength and durability and often are not convenient to use.

Further objects of the present invention, therefore, are to avoid the above difficulties and provide a clothespin having a minimum amount of material for the size and gripping capacity.

In carrying out the above objects, I provide in effect two leg members on either side of the conventional clothesline-receiving slot, and which are relatively movable to allow a spreading over thick material on the line with a minimum tendency to spread the legs at the juncture with the handle.

Essentially, I provide a unitary clothespin structure in which the gripping surfaces are formed as relatively movable flexible chord members joined with outer leg members at the open end of the line slot and connected together at the inner end of the slot, and slightly spaced from the outer leg members to permit a spreading action for a limited distance within and relative to the outer leg members. as will more fully appear in the following specification which relates to the accompanying drawings illustrating a preferred embodiment of this invention.

Fig. 1 is a perspective view of a preferred embodiment of my clothespin structure;

Fig. 2 is a side elevation of the same;

Fig. 3 is an elevation at right angles to the view of Fig. 2;

Figs. 4, 5 and 6 are transverse sections taken on planes indicated by the lines C—C, B—B and A—A, respectively, of Fig. 3;

Figs. 7 and 8 are diagrammatic views indicating the action of the gripping surface members.

Essentially, the structure as shown comprises a handle 1, which in some instances may be omitted, and integrally joined with the handle are two composite leg members E and F, each having inner and outer members substantially parallel for the purpose to be hereinafter described. The shapes of the inner and outer members are identical in each of the leg members E and F, and in the following description like reference numerals are applied to like parts.

Between the outer leg members 2, parallel with them and spaced therefrom are two resilient chords or gripping members 10, joined at 11 with the lower ends of the outer leg members 2. The chord members 10 are joined by a curved portion 12 and, in turn, to a connecting member 13 which unites with the arch formed by the curved portions 4.

The outer members 2 are shown as stiffened by slightly thickened portions 2a, and may be reinforced still further by outstanding ribs or fins 2b merging with the flaring tip portions 5. The ribs 2b taper upwardly and outwardly and then curve inwardly to the handle as shown.

Inside of the handle which is essentially a loop formed in approximately the same sectional shape as the members 2 and 2a is a reinforcing cross web 1b.

In practice these sections may be proportioned approximately as shown particularly in Figs. 4, 5 and 6. A clothespin of suitable size may be made of an acrylic resin, cellulose-acetate, or like material, and the sections may be kept to about fifty one-thousandths of an inch maximum thickness, and have a width parallel with a clothesline of one-half to five-eighths of an inch, and with a line-receiving slot of about two inches in length.

Such a pin will embrace several thicknesses of cloth on an average size clothesline with a gripping action and strength comparable to a good wooden clothespin of the usual type.

The increased gripping capacity relative to the size and weight is due to the unique functioning of the arrangement shown.

In applying the clothespin to a clothesline, it will be seen that the inner gripping surfaces of the members 10 are spread intermediate their ends, and the space between these members 10 and the adjacent surfaces of the outer leg portions 2 allows such a spreading movement of, say, one-sixteenth of an inch at each side before the further spreading movement tends to spread the outer legs.

The inner surfaces of the members 12 may be serrated or formed with undulations S as shown, and they are preferably normally so spaced apart that they will grip thin clothing or cloth on a small line. When the members 10 are spread by a large clothesline R with a comparatively heavy material to be held thereon, these members 10 assume the position shown in Fig. 7 converging each way from the line R upwardly and downwardly, as indicated at 10d.

Because the inner chord members are anchored to the upper and lower ends of the members 2 by the connections 11 and 13 (as indicated also at 11d and 13d) the inner chord members tend to pull upwardly on the lower ends of the outer members 2, drawing them inwardly as indicated by the lines 2d in Fig. 7.

As the clothesline with material thereon is passed into the slot or outwardly from the lower end of these members, the flared ends 5 spreading as indicated at 5d in Fig. 8 carry the lower ends of the members 2 outwardly as there indicated at 2d.

Contrary to the effect when using an ordinary clothespin, as the line R and material are moved upwardly in my structure, the angle between the legs is not increased in proportion to the distance which the line and material move toward the juncture or top of the slot, but rather as the line and material pass the joining points 11d, the flexible chords 10 begin to spread outwardly with relation to the outer members 2 until the relative position of the parts is that shown in Fig. 7. Here gripping engagement of considerable bulk is possible, while the members 2 are still not spread but may be drawn inwardly.

Substantially maximum gripping action occurs approximately midway or slightly above the center unless the line is very small, in which case further gripping action may be effected by forcing the pin down to the top of the slot between the members 10.

The flexibility of capacity and strong gripping action is thus attained with the use of a minimum amount of material. The tendency to split the pin by wedging toward the top of the slot is reduced essentially by the novel functions of flexibility of the inner chord gripping surface members and their "bow string" action between the upper and lower ends of the outer leg portions 2, which action tends to draw inwardly on the lower ends of these outer members as the middle portion of the chord members 10 are separated.

With the design shown I may provide a pin of considerable width without unduly adding to the weight. This lends stiffness to the structure and adds to convenience in handling.

From the foregoing description it will be seen that I have provided a unitary clothespin structure most economical of the material of which it may be formed, and which is capable of being injection molded, lending itself to high production and economy in manufacture.

The structure by which I accomplish the objects above set forth, it will be seen from inspection particularly of Figs. 7 and 8, may be said to comprise essentially two flexible parallel narrow U-shaped loops connected at their open ends and providing flaring surfaces, and connected at their closed ends to afford the mutual support and functioning described.

Various modifications of my structure may be made without departing from the spirit of my invention as defined in the appended claims.

I claim:

1. A unitary clothespin of molded plastic material having a handle portion and a pair of two-part leg members comprising inner and outer parts joined at the open line receiving end of the slot of the clothespin, the inner members being flexible and connected together at the upper end of the slot and also connected to the handle portion, stiffening ribs formed on the outer leg members, the two parts of each leg member being spaced apart to permit relative movement thereof during gripping and releasing action, the spacing being such as to limit spreading of the inner members to movement within their breaking angle.

2. A unitary molded plastic clothespin structure comprising a pair of leg members and a handle portion joined therewith, the leg members having flared lower ends and being shaped to form a space between them wider than the usual clothesline gripping slot, and each leg having a gripping surface element substantially parallel therewith, spaced therefrom and forming a flexible tension member each extending from end to end of its respective leg and spaced therefrom a distance such that the legs are engaged to prevent undue spreading of the gripping surface elements, said leg members being provided with stiffening reinforcing material.

3. A unitary clothespin structure comprising two U-shaped loops, one inside of the other, the legs of the inner loop being in the nature of flat flexible strips and the legs of the outer loop being substantially parallel with the inner legs, a thickened connection joining the U-loops at their closed ends, a thickened connection joining each inner leg to the adjacent leg of the outer loop, flaring surfaces formed at the latter connections, the legs of the outer loop having longitudinal stiffening elements formed thereon and joining with the connection at the closed portion of the U-loops.

4. A unitary clothespin structure comprising a handle portion and legs attached thereto and formed in the nature of four substantially parallel strips, the inner strips serving as the clothesline slot gripping means and being joined with the outer strips and with the handle and also being joined with the outer strips at the open end of the clothesline receiving slot, the inner strips being relatively flexible and the outer strips having longitudinal reinforcing stiffening elements formed thereon, the inner strips being capable of flexing movement between their ends outwardly toward the outer strips and being so proportioned that such flexing exerts a tension upon and longitudinally of the outer strips.

JOHN B. TEGARTY.

REFERENCES CITED

The following references are of record in the file of this patent:

UNITED STATES PATENTS

| Number | Name | Date |
|---|---|---|
| 186,055 | Mihan | Jan. 9, 1877 |
| 1,162,578 | De Forge | Nov. 30, 1915 |
| 1,250,308 | Hanson | Dec. 18, 1917 |
| 2,310,156 | Van Der Clute | Feb. 2, 1943 |